United States Patent Office 2,759,979
Patented Aug. 21, 1956

2,759,979

MANUFACTURE OF ALDEHYDES BY THE PYROLYSIS OF ACETALS

Hugh J. Hagemeyer, Jr., and Milton A. Perry, Kingsport, Tenn., assignors to Eastman Kodak Company, Rochester, N. Y., a corporation of New Jersey No Drawing. Application May 6, 1953,
Serial No. 353,425

14 Claims. (Cl. 260—601)

The present invention relates to the preparation of aldehydes. More particularly, the invention is concerned with the catalytic pyrolysis of acetals to produce aldehydes.

It has been known for some time that at relatively low temperatures, e. g. from 40° C. up to 300° C., the catalytic pyrolysis of acetals leads to the formation of alcohols and unsaturated ethers. In one specific embodiment of this method, precious metal catalysts, e. g. silver, gold and platinum metals, are employed to increase the yield of ether. It is also known that pyrolysis of acetals at higher temperatures results in the formation of products of decomposition of the intermediate ether and alcohol. For instance, it is known that over certain catalysts the pyrolysis under certain experimental conditions leads to the production of hydrocarbons, water, hydrogen, carbon monoxide and methane.

We have now found that with suitable contact materials heated to temperatures within a relatively high range acetals may be converted directly to aldehydes if passed in the vapor phase over the contact materials for a period of relatively short duration.

Our discovery, besides providing a new process for the preparation of aldehydes, serves to form aldehydes of longer carbon chains than those employed in preparation of the acetal starting material. The new method of aldehyde synthesis advantageously avoids certain defects in the prior methods of synthesis. For instance, in comparison to the aldol process, the instant method comprises an improvement in that no hydrogenation step is required. The invention, as a further illustration, makes possible the synthesis of propionaldehyde from the starting materials methanol and acetaldehyde by means of the intermediate formation of dimethyl acetal followed by the pyrolysis thereof and recovery from the pyrolysis products of propionaldehyde.

Accordingly, it is a primary object of the present invention to provide a new method for the synthesis of aldehydes. A further object is to provide for the synthesis of aldehydes of longer chain length than the starting materials employed and in which no hydrogenation is necessary. A still further object of the invention is the provision of particularly advantageous contact materials and methods of using them to produce aldehydes by the pyrolysis of acetals. Other objects will be obvious from a consideration of the accompanying specification and claims.

The objects are accomplished by the invention which contemplates a method comprising the steps of (A) passing the vapor of an acetal of the formula

RCH$_2$CH(OCHR')$_2$ wherein R and R' are members of the group consisting of hydrogen, alkyl radicals, and aryl radicals over a suitable contact material having a temperature within the range of 375°–600° C. and (B) recovering by distillation from a product mixture thus formed an aldehyde having the formula

R'CH$_2$CHRCHO wherein R and R' are as designated above.

The direct pyrolysis of acetals to aldehydes in accordance with the invention may be illustrated by the following equations showing the preparation of various aldehydes by reaction in the presence of contact materials heated to a relatively high temperature of 375°–600° C.:

Propionaldehyde from dimethyl acetal—

$$CH_3CH(OCH_3)_2 \rightarrow CH_3CH_2CHO + CH_3OH$$

Isobutyraldehyde from dimethyl propional—

$$CH_3CH_2CH(OCH_3)_2 \rightarrow (CH_3)_2CHCHO + CH_3OH$$

Normal hexaldehyde from dibutyl acetal—

$$CH_3CH(OC_4H_9)_2 \rightarrow n\text{-}C_5H_{11}CHO + C_4H_9OH$$

2-ethyl hexaldehyde from dibutyl butal—

$$CH_3CH_2CH_2CH(OC_4H_9)_2 \rightarrow$$
$$C_4H_9CH(C_2H_5)CHO + C_4H_9OH$$

It is obvious from the equations that in the reaction the carbon chain of one alcohol group attaches itself to the alpha (number 2) aldehyde carbon atom while the second alcohol component is regenerated as such.

The invention is illustrated in the following examples.

*Example 1*

In a stainless steel reactor 20″ high with a 1″ inside diameter and a catalyst space of 200 cc., two runs were made employing molybdenum oxide on aluminum oxide as catalyst. The reaction temperature used was 400° C. and the feed rate of approximately 1 liter of diethyl acetal gave an average reaction time of 1.56 seconds. The conversions to normal butyraldehyde were 12% and 15% respectively with ultimate yields of better than 90%.

*Example 2*

One liter of acetal was vaporized and passed upward over an alumina gel catalyst at 400° C. using a contact time of 1.5–2.0 seconds. A 35% conversion to normal butyraldehyde was obtained. The yield to butyraldehyde was 87%.

*Example 3*

400 grams of acetal was vaporized and passed over a catalyst comprised of thoria alumina gel in ⅛″ pellets. The total catalyst volume was 258 ml. and the temperature was held between 410 and 430° C. The contact time employed was 1.6–1.8 seconds. Distillation of the product gave 230 grams of normal butyraldehyde in addition to unchanged acetal.

*Example 4*

Two runs were made employing molybdenum oxide on aluminum oxide as catalyst. The reaction temperature used was 400° C. and the feed rate gave an average reaction time of 1.56 seconds. The conversions to normal butyraldehyde were 12 and 15% respectively with ultimate yields of better than 90%. The formation of ethyl vinyl ether in the two runs was negligible.

*Example 5*

Four moles of dibutyl acetal were passed through a reactor comprised of a stainless steel tube 20″ high 1″ I. D. packed with ⅛″ pellets of thoria on alumina heated to 430° C. The feed rate was 15 cc. per minute through a catalyst volume of 200 cc. The conversion to n-hexaldehyde was 21%, with an ultimate yield of 65%.

Example 6

The reactor as described in Example 5 was packed with magnesia on "Celite" and six moles of diethyl butal was passed through at a rate of 11.5 cc. per minute. The temperature was 410°–450° C. A conversion of 28% was obtained to 2-ethylbutyraldehyde with an ultimate yield of 82%. A second run was made using steam as a diluent and hydrolysis of the acetal took place rather than rearrangement.

Example 7

Isobutyl isobutal was converted to isobutyl isobutyraldehyde in 18% conversion and 53% yield by passing preheated isobutal over 1/8' chromia on alumina pellets at 450° C. using a feed rate of 13.6 cc. per minute and a catalyst volume of 200 cc. The products were isolated by distillation and unchanged acetal was recovered by distillation.

Example 8

Using the reactor described in Example 1 and molybdena on "Celite" at 450° C., diethyl acetal was fed at 12 cc. per minute through a catalyst bed of 200 cc. volume. Conversion to n-butyraldehyde was 15% with ultimate yields of 80%. Azeotropic distillation was used to separate butyraldehyde from unchanged acetal.

Example 9

In a second run carried out as in Example 8 but using vanadia on "Celite," conversion of acetal to n-butyraldehyde was 18% with an ultimate yield of 72%. Azeotropic distillation was used to separate the n-butyraldehyde.

Example 10

In the same stainless steel reactor described in previous examples was placed 200 cc. of copper on silica gel pellets. Diethyl acetal was passed over this catalyst at 415°–445° C. at a feed rate of 12.5 cc. per minute to give 16% conversion to n-butyraldehyde with 70% yield.

Example 11

Diethyl hexal was passed over 1/8" silver on alundum pellets in the reactor previously described at a temperature of 450° C. A feed rate of 18 cc. per minute through the catalyst bed was maintained with a total feed of 2 liters. A conversion of 30% to 2-ethylhexanal was obtained with an ultimate yield of 81%.

From the foregoing examples it will be obvious that a number of contact materials of well-known types are suitable for carrying out the invention. While the contact materials are not considered to be critical to the process we have found that among the more advantageous materials should be included alumina, alumina gel, molybdena on alumina, thoria on alumina and palladium on asbestos. Possibly the most advantageous contact material of which we are aware is silver on alundum. Thus, while it has been found that the temperature range is critical to the reaction of the invention, those skilled in the art will recognize that other contact materials not named herein may be found quite suitable for practice of the invention.

The high temperature range requires use of a certain amount of care in controlling the time of exposure of the gasses to the hot contact materials. While the reaction time range is subject to variations dependent upon the particular temperature and the particular acetal and contact material employed, a period of time within the range of about 0.5 to 3.0 second has been found more advantageous.

The "Celite" employed in the examples is a diatomaceous earth as preformed and sold by the Johns-Manville Sales Corp.

We claim:
1. A method for the preparation of an aldehyde comprising the steps of (a) passing the vapor of an acetal of the formula

$$RCH_2CH(OCHR')_2$$

wherein R and R' are members of the group consisting of hydrogen and lower alkyl radicals over a suitable contact material heated to a temperature within the range 375°–600° C. and (b) recovering by distillation from a product mixture thus formed an aldehyde having the formula $$R'CH_2CHRCHO$$

wherein R and R' are as designated above.

2. A method as defined in claim 1 wherein the contact material is a substance selected from the group consisting of alumina, alumina gel, molybdena on alumina, thoria on alumina, silver on alundum, and palladium on asbestos.

3. A method as defined in claim 2 wherein the acetal vapor is subjected to the heated contact material for a period within the range of about 0.5 to 3.0 seconds.

4. A method for the preparation of propionaldehyde comprising the steps of (a) passing the vapor of dimethyl acetal over a suitable contact material selected from the group consisting of alumina, alumina gel, molybdena on alumina, thoria on alumina, silver on alundum, and palladium on asbestos heated to a temperature within the range 375°–600° C. and (b) recovering propionaldehyde by distillation from a product mixture thus formed.

5. A method as defined in claim 4 wherein the heated contact material is molybdena on alumina, and the reaction is carried out at a temperature of about 400° C. for a period of time between 0.5 and 3.0 seconds.

6. A method as defined in claim 4 wherein the contact material is alumina gel and the reaction is conducted at a temperature of about 400° C. for a period of time within the range of about 0.5 to 3.0 seconds.

7. A method as defined in claim 4 wherein the contact material is thoria-alumina gel and the reaction is carried out at a temperature within the range 410°–430° C. for a period of time within the range of about 1.5 to 2.0 seconds.

8. A method for the preparation of isobutyraldehyde comprising the steps of (a) passing the vapor of dimethyl propional over a heated contact material selected from the group consisting of alumina, alumina gel, molybdena on alumina, thoria on alumina, silver on alundum, and palladium on asbestos at a temperature within the range 375°–600° C. for a period within the range of about 0.5 to 3.0 seconds and (b) recovering isobutyraldehyde by distillation from a product mixture thus formed.

9. A method as defined in claim 8 wherein the heated contact material is molybdena on alumina, and the reaction is carried out at a temperature of about 400° C. for a period of time between 1.5 and 2.0 seconds.

10. A method as defined in claim 8 wherein the heated contact material is alumina gel and the reaction is conducted at a temperature of about 400° C. for a period of time within the range of about 1.5 to 2.0 seconds.

11. A method as defined in claim 8 wherein the heated contact material is thoria-alumina gel and the reaction is carried out at a tempertaure within the range 410°–430° C. for a period of time within the range of about 1.5 to 2.0 seconds.

12. A method for the preparation of an aldehyde comprising the steps of (a) heating the vapor of an acetal of the formula $$RCH_2CH(OCHR')_2$$

wherein R and R' are members of the group consisting of hydrogen and lower alkyl radicals to a temperature within the range of 375°–600° C. and (b) recovering by distillation from a product mixture thus formed, an aldehyde of the formula $$R'CH_2CHRCHO$$

13. A method as defined in claim 12 wherein the acetal is dimethyl acetal and the aldehyde is propionaldehyde.

14. A method as defined in claim 12 wherein the acetal is dimethyl propional and the aldehyde is isobutyraldehyde.

References Cited in the file of this patent

UNITED STATES PATENTS 2,501,144  Saunders _____ Mar. 21, 1950

OTHER REFERENCES

Richter; Organic Chemistry, 3rd ed., vol. 1 (1944), pp. 226–227, Elsevier Publishers